(12) United States Patent
Kruglick (10) Patent No.: US 9,288,206 B2
(45) Date of Patent: Mar. 15, 2016

(54) SHARED SECRET TECHNIQUES FOR UBIQUITOUS COMPUTING DEVICES

(71) Applicant: Empire Technology Development LLC, Wilmington, DE (US)

(72) Inventor: Ezekiel Kruglick, Poway, CA (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 0 days.

(21) Appl. No.: 14/358,146

(22) PCT Filed: Jul. 9, 2013

(86) PCT No.: PCT/US2013/049750
§ 371 (c)(1),
(2) Date: May 14, 2014

(87) PCT Pub. No.: WO2015/005910
PCT Pub. Date: Jan. 15, 2015

(65) Prior Publication Data
US 2015/0020158 A1    Jan. 15, 2015

(51) Int. Cl.
*H04L 9/32* (2006.01)
*H04L 29/06* (2006.01)

(52) U.S. Cl.
CPC .............. *H04L 63/0853* (2013.01); *H04L 9/32* (2013.01); *H04L 63/083* (2013.01)

(58) Field of Classification Search
CPC ...... H04L 63/083; H04L 63/0853; H04L 9/32
USPC .......................................................... 726/3
See application file for complete search history.

(56) References Cited

U.S. PATENT DOCUMENTS

| 6,338,140 | B1 * | 1/2002 | Owens et al. ................. 713/168 |
| 7,190,969 | B1 * | 3/2007 | Oh ........................... H04W 8/26 455/461 |
| 2009/0113527 | A1 * | 4/2009 | Naaman et al. .................... 726/5 |
| 2010/0088519 | A1 * | 4/2010 | Tsuruoka et al. ............. 713/176 |
| 2011/0202988 | A1 * | 8/2011 | Otranen et al. .................... 726/8 |

* cited by examiner

*Primary Examiner* — Jung Kim
*Assistant Examiner* — Thomas Ho
(74) *Attorney, Agent, or Firm* — Brundidge & Stanger, P.C.

(57) ABSTRACT

Technologies and implementations for secure access to online services are generally disclosed.

20 Claims, 4 Drawing Sheets

300 A computer program product

302 A signal bearing medium 304 at least one of machine readable instructions that, when executed by one or more processors, operatively enable a secure shared verification module (SSVM) to:

receive an indication of a first authentication from a device, the first authentication being at the device level and including information of a random pad associated with the device;
determine whether the random pad is included in a device related database;
establish, responsive to determination that the random pad is included in the device related database, a secure communication link with the device;
receive an indication of a second authentication from the device via the established secure communication link, the second authentication being at a user level; or
move, responsive to the received second authentication, the random pad from the device related database to a user related database.

| 306 a computer-readable medium | 308 a recordable medium | 310 a communications medium |
|---|---|---|

SHARED SECRET TECHNIQUES FOR UBIQUITOUS COMPUTING DEVICES

CROSS-REFERENCE TO RELATED APPLICATION

The present application in a U.S. National Stage filing under 35 U.S.C. §371 of International Application No. PCT/US2013/049750, filed on Jul. 9, 2013.

BACKGROUND

Unless otherwise indicated herein, the approaches described in this section are not prior art to the claims in this application and are not admitted to be prior art by inclusion in this section.

Distribution of shared secrets with newly manufactured electronic devices has been employed with various situational results. So far, no approach has offered the end user an experience of out-of-the-box security for device initiation, registration and utilization of ongoing services. Currently, there is no mass-market compatible system capable of providing users with large amounts of secure user-specific shared secrets without assuming some level of broadcast security for initial transport. Mass hacking attacks have rendered the assumption of network transport security tentative at best. Even though a device may be preconfigured with a user login when shipped from the manufacturer or seller, the first login by the user may not itself be secure. For example, if the user first turns on the device in the presence of a compromised network, the entire device and/or online ecosystem may be subject to an initial man-in-the-middle type attack or the like. As a result, a user may not realize he or she has an infection on his or her device if the new device is compromised by such an attack.

SUMMARY

Detailed herein are various illustrative methods for shared secret techniques for ubiquitous computing devices. Example methods may include a method for secure access to online services, wherein the method may include receiving an indication of a first authentication from a device, the first authentication being at the device level and including information of a random pad associated with the device, determining whether the random pad is included in a device related database, establishing, responsive to determination that the random pad is included in the device related database, a secure communication link with the device, receiving an indication of a second authentication from the device via the established secure communication link, the second authentication being at a user level, and responsive to the received second authentication, moving the random pad from the device related database to a user related database.

The present disclosure also describes various example machine readable media having stored therein instructions that, when executed by one or more processors, operatively enable a secure shared verification module (SSVM) to receive an indication of a first authentication from a device, the first authentication being at the device level and including information of a random pad associated with the device, determine whether the random pad is included in a device related database, establish, responsive to determination that the random pad is included in the device related database, a secure communication link with the device, receive an indication of a second authentication from the device via the established secure communication link, the second authentication being at a user level, and move, responsive to the received second authentication, the random pad from the device related database to a user related database.

The present disclosure additionally describes example systems for secure access to online services. Example systems may include a first database, a second database communicatively coupled with the first database, a processor communicatively coupled with the first database and the second database, and a secure shared verification module (SSVM) communicatively coupled to the processor. The SSVM may be configured to receive an indication of a first authentication from a device, the first authentication being at the device level and including information of a random pad associated with the device, determine whether the random pad is included in the first database, establish, responsive to determination that the random pad is included in the first database, a secure communication link with the device, receive an indication of a second authentication from the device via the established secure communication link, the second authentication being at a user level, and move, responsive to the received second authentication, the random pad from the first database to the second database.

The foregoing summary is illustrative only and not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure, and are therefore, not to be considered limiting of its scope. The disclosure will be described with additional specificity and detail through use of the accompanying drawings.

In the drawings.

DETAILED DESCRIPTION

The following description sets forth various examples along with specific details to provide a thorough understanding of claimed subject matter. It will be understood by those skilled in the art that claimed subject matter may be practiced without one or more of the specific details disclosed herein. Further, in some circumstances, well-known methods, procedures, systems, components and/or circuits have not been described in detail, in order to avoid unnecessarily obscuring claimed subject matter.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, and designed in a wide variety of different configurations, all of which are explicitly contemplated and/or made part of this disclosure.

This disclosure is drawn, inter alia, to technologies including methods, devices, systems and computer readable media related to shared secret techniques for ubiquitous computing devices.

Figure 1:
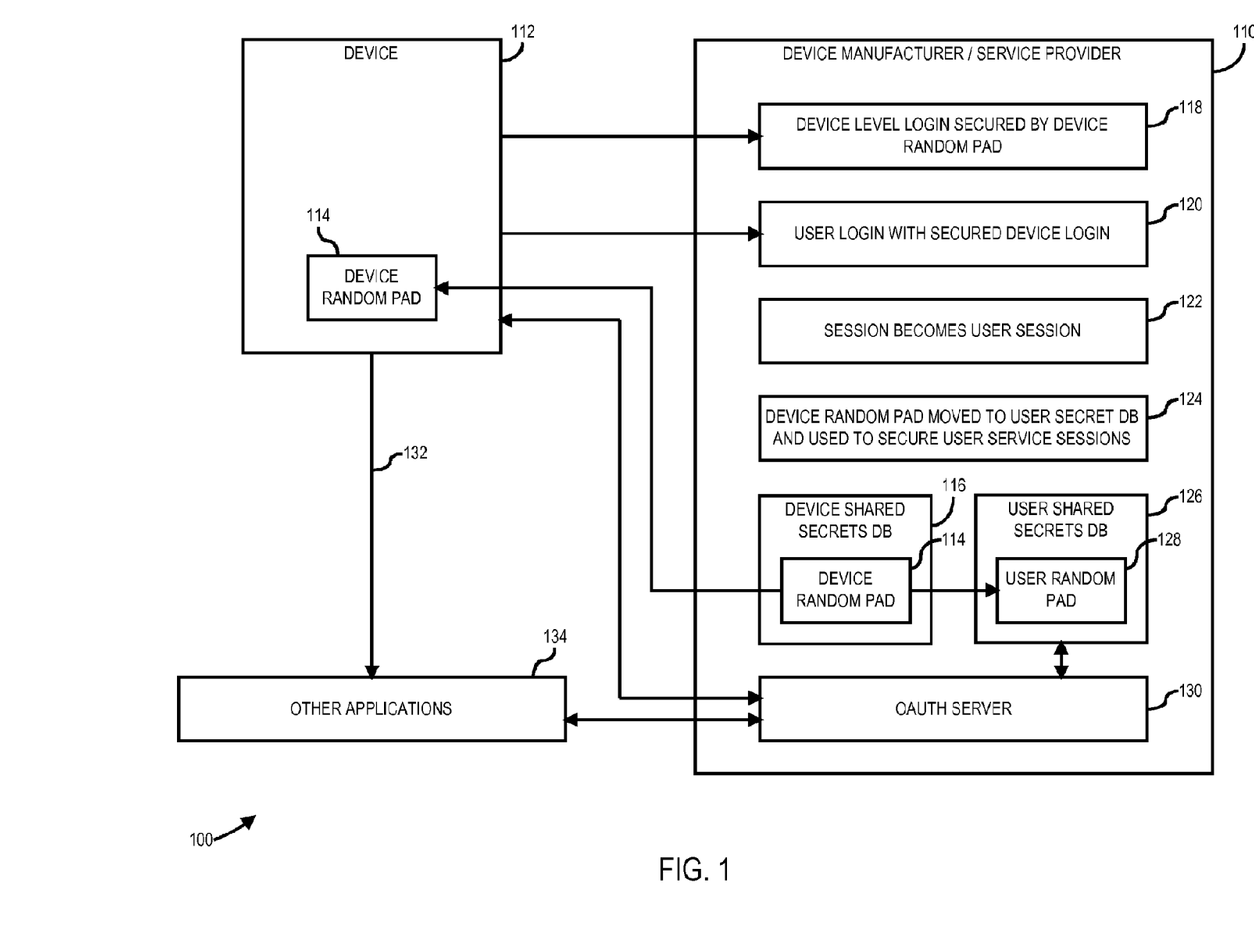
FIG. 1 illustrates a block diagram of a system for secure access to online services in accordance with one or more embodiments.

Referring now to FIG. 1, a block diagram of a system 100 for secure access to online services in accordance with one or more embodiments will be discussed. As shown in FIG. 1, system 100 for secure access to online services may include a manufacturer (device manufacturer and/or service provider) 110. In general, the term device manufacturer 110 will be utilized herein to denote a company or business that makes or sells devices such as a device 112 to end users, either as a direct manufacturer, seller or reseller, or contract manufacturer, and/or a service provider who may sell devices to end users through their own brand regardless of whether or not they manufacture or sell the devices themselves. It is noted that the scope of the claimed subject matter is not limited in these respects. Users may receive device 112 from manufacturer 110, and may initially boot up or turn on device 112 for initial setup or configuration when received or purchased. Device 112 may include any electronic device, computing platform, information handling system, telephone, smartphone, tablet, music player, gaming system, or Global Positioning System (GPS) device that is capable of communicating over a network in order to operate, receive services, download applets or applications, or to otherwise receive data or software updates. As such, device 112 may be referred to as a ubiquitous computing (ubicomp) device, although the scope of the claimed subject matter is not limited in this respect.

In order to accomplish a secure initial operation or setup by the user, manufacturer 110 may place or include a device random pad 114 on device 112 during a manufacturing process and also store or maintain a copy or record of device random pad 114 in a device shared secrets database 116. In some embodiments, device random pad 114 may comprise a store of information which may comprise, for example, random data received during manufacturing that is associated with device 112 initially, optionally without being associated with any specific user who purchases the device. Random data generally may be defined as information having sufficient entropy for utilization as a key or a pad for encryption purposes in order to reduce the chance that the key or pad may be discovered unintentionally or by a malfeasor. In cryptography, a pad, also referred to as a one-time pad, is a type of secret random key having the same length as an original plain text wherein encryption is performed on the plain text using a modular addition with a bit or character from the pad. In general, device random pad 114 may be either asymmetric or symmetric, and the scope of the claimed subject matter is not limited in this respect. In some embodiments, the random data of device random pad 114 is known to manufacturer 110 since device random pad 114 is also stored in device shared secrets database 116. Since device random pad 114 is shared with device 112 and manufacturer 110, device random pad 114 may be utilized to secure a device session with manufacturer 110. The secure device session provides the user a safe or secure channel through which to conduct an initial login and user identification. After initial login and user identification, device random pad 114 may be associated with the user and converted to a user random pad 128. User random pad 128 may be used going forward for future secure user sessions. In some embodiments, device random pad 114 allows for a secure device level login so that the information may be converted to user random pad 128 to secure one or more other sessions or actions such that the user is insulated from the initial login with device 112. Such an arrangement may further allow the user to obtain a shared secret between the user and manufacturer 110 for future service use and/or logins, although the scope of the claimed subject matter is not limited in these respects.

In one example, device random pad 114 may be generated in the following manner. Manufacturer 110 may fill at least a portion of empty space of storage or memory of device 112 with random data. The random data may occupy a relatively small portion of storage or memory, or in some embodiments may occupy a significant portion of empty or unused storage or memory. A copy of the random data stored on device 112 may then be stored in device shared secrets database 116 that is maintained by manufacturer 110 or otherwise by a third party on behalf of manufacturer 110. The random data may be associated with the device identifier (ID) of device 112 as a one-time encryption pad or other similar shared secret. One-time pads are known to be generally safe and unbreakable. In such an example, when the user first operates device 112, device 112 will establish a secure, device-identified link with manufacturer 110 to set up a user identity, install initial applications, and/or establish code tokens for future security. The device ID, serial number, or media access control (MAC) address of device 112 may be provided to manufacturer 110 in the initial session to allow manufacturer 110 to fetch the associated device random pad 114 from shared secrets database 116 in order to enable the secured device-level session. Since the session is a secure session, the user may now login and establish user credentials with manufacturer 110 to allow manufacturer 110 to associate device random pad 114 with the user so that device random pad 114 may be converted to user random pad 128 associated with the user in user shared secretes database 126 for future use.

In one example, when the user receives device 112, for example from any available sales channel, the first login by device 112 is a device level login 118 that is secured by device random pad 114. Such an arrangement provides secure first device level login 118 session within which the user may make a first user login 120 with manufacturer 110 for example to setup device 112 for first use. In one embodiments, secure first device level login 118 is user-independent in that the secured login does not involve any user specific information or user specific information that is transmitted over a network since the secured login utilizes device random pad 114 that is provided by manufacturer 110 and which need not be transmitted over a network in order to get device random pad 114 onto device 112. Once the user makes first user login 120, the session becomes a user session 122, and device random pad 114 may be removed 124 from device shared secrets database 116 and placed in a user shared secrets database 126 wherein device random pad 114 is converted to a user random pad 128. At this point, when the user logs in from device 112, the user may be securely connected with the services of manufacturer 110 or service provider, which provides a secure environment for purchases and/or application, downloads.

In one example, manufacturer 110 may provide secondary authentication for other applications 134 that may not be provided by manufacturer 110 directly but may be provided by a third party or service through authentication by manufacturer 110 such as through an application or app store. For example, manufacturer 110 or service provider may utilize an identification server such as an open standard for authentication (OAuth) server 130 using user random pad 128 to authenticate secure connections 132 to other applications 134 which may be provided by manufacturer 110 or service provider, or by some other party. In such examples, at least part of the one-time pad embodied as user random pad 128 may be utilized as desired to securely establish initial logins with such applications and/or web services. For example, user random pad 128 may be utilized to allow population of applications or apps on device 112 and/or initial handshakes with web applications accessed by device 112 through such secondary authentication. To allow extended use of user random pad 128 in this manner, the one-time device random pad 114 installed on device 112 may be as large as the entire amount of available storage space on device 112 if desired, and then at least portions of device random pad 114 may be deleted at any time after initial use to allow for storage of user data and/or other applications. So long as device shared secrets databases 116 and/or 126 of manufacturer 110 are secure, the utilization of device random pad 114 on device 112 may be considered safe.

In one example, device level login 118 may be secured by device random pad 114 by having device 112 report its identification (ID) to manufacturer 110 and then start using device random pad 114 for security. This may be all manufacturer 110 needs in order to look up device random pad 114 in device shared secrets database 116, but may not offer an attacker any traction since an attacker would also need to have a copy of device shared secrets database 116.

After initial device level login 118 is made, device random pad 114 is converted to user random pad 128 in user shared secrets database 126, an application running on device 112 is able to provide at least a portion or derivative of information derived from device random pad 114 to validate logins on other platforms via OAuth server 130 anytime the user is in possession of device 112. In such an arrangement, device 112 becomes a passkey for any service without requiring secure information transport. However, since the information pertaining to device random pad 114 is only good for a device level login at first, a thief who steals device 112 before the user receives device 112 will not be able to access to any of the user's information or accounts. It is noted that this is accomplished by using device random pad 114 when device 112 is first shipped to the user, and then device random pad 114 is converted or transformed to user random pad 128 that can then be used to verify user sessions. The random data of device random pad 114 may be at least partially encrypted in some embodiments before all of the data is used. If device random pad 114 is encrypted by a key that is provided by the holder of user shared secrets database 126 and the key is not saved, device random pad 114 is secure against local compromise at device 112 and can be accessed by device 112 by sending the key and then using device random pad 114 without further preamble. In some instances, it may be assumed that the shared secret may become less secure over time as device 112 may have numerous applications and/or files installed thereupon. In some embodiments, system 100 may be arranged such that some events may wholly or at least partially decertify the secret. For example, a shared secret locally encrypted on device 112 may be considered less secure if any non-approved application is stored on or installed on device 112 such as an application that was not obtained from an application store, or app store, of manufacturer 110 or service provider.

In one example, the conversion of device random pad 114, a device-associated secret, to user random pad 128, a user-associated secret, allows manufacturer 110 to authenticate other services so that manufacturer 110 is able to provide the user with an overall layer of security across a browser and/or other application sessions based on a secret that has never been transmitted over a network. Such an arrangement provides a safe initial login and in addition provides safe future connections and/or data transfers. By having device random pad 114 associated with device 112 and then transitioning device random pad 114 to user random pad 128 associated with a user, manufacturer 110 is able to have a reserve of user-specific random information that can be leveraged to a variety of functions. An example method for secure access to online services using device random pad 114 is shown in and described with respect to FIG. 2, below.

Figure 2:
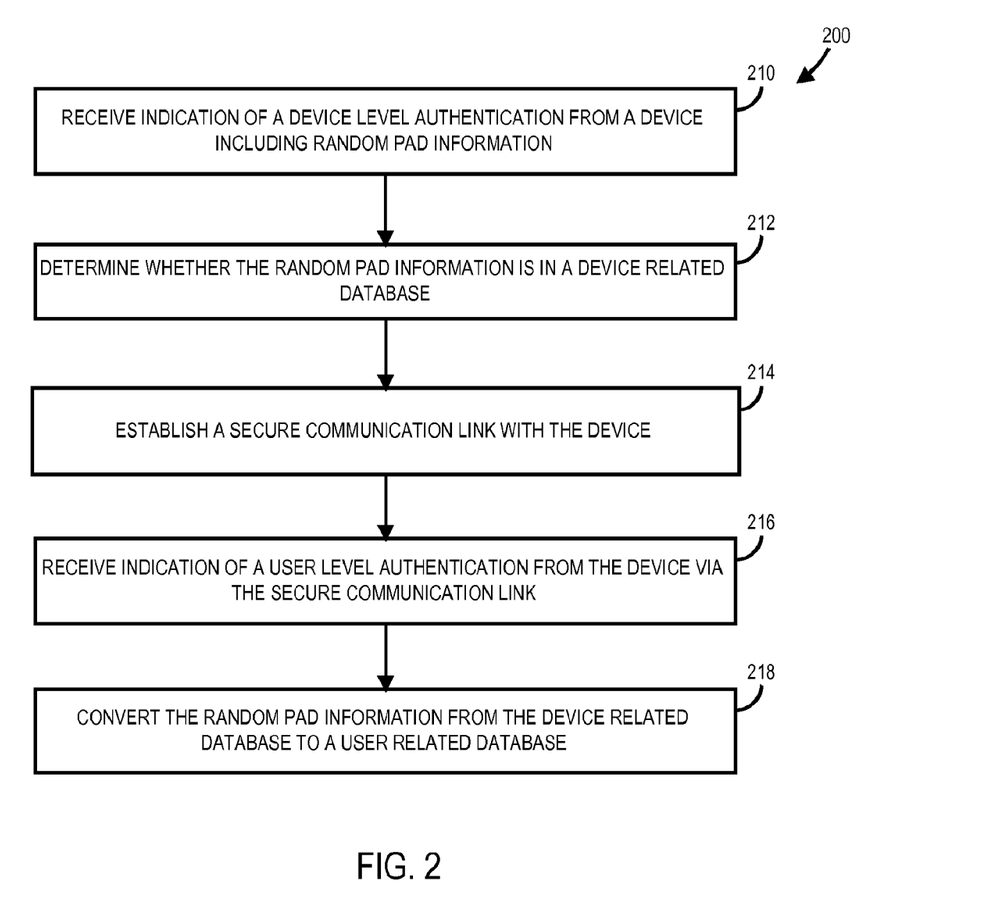
FIG. 2 illustrates a flow chart of an example method for secure access to online services in accordance with one or more embodiments.

FIG. 2 illustrates a flow chart of an example method 200 for secure access to online services, arranged in accordance with at least some embodiments of the present disclosure. In some portions of the description, an illustrative implementation of method 200 is described with reference to elements of system 100 of FIG. 1. However, the described embodiments are not limited to this depiction. More specifically, some elements depicted in FIG. 1 may be omitted from example implementations of the method detailed herein. Furthermore, other elements not depicted in FIG. 1 may be used to implement example methods.

Additionally, FIG. 2 employs a block diagram to illustrate example method 200 detailed therein. The block diagram may set out various functional blocks or actions that may be described as processing steps, functional operations, events and/or acts, etc., and may be performed by hardware, software, and/or firmware. Numerous alternatives to the functional blocks detailed may be practiced in various implementations. For example, intervening actions not shown in the figures and/or additional actions not shown in the figures may be employed and/or some of the actions shown in the figures may be eliminated. In some examples, the actions shown in one figure may be operated using techniques discussed with respect to another figure. Additionally, in some examples, the actions shown in these figures may be operated using parallel processing techniques. The above described, and others not described, rearrangements, substitutions, changes, modifications, etc., may be made without departing from the scope of claimed subject matter.

Turning now to method 200 and FIG. 2, beginning at block 210, "Receive Indication Of A Device Level Authentication From A Device Including Random Pad Information", a first authentication from device 112 is received at block 210, or an indication of a first authentication is received, wherein an indication refers to a sign denoting that the first authentication was performed, attempted, sent, and/or received. Random pad information may refer to the content of device random pad 114 in whole or at least in part, for example a sufficient amount of content to perform authentication as discussed herein. The first authentication may be at the device level and may include device random pad 114 associated with device 112. Continuing from block 210 to block 212, "Determine Whether The Random Pad Information Is In A Device Related Database", a determination may be made whether device random pad 114 is included in device shared secrets database 116. Continuing from block 212 to block 214, "Establish A Secure Communication Link With The Device", in the event that device random pad 114 is included in device shared secrets database 116, a secure communication link may be established with device 112 in response to the determination that device random pad 114 is included in device shared secrets database 116. Continuing from block 214 to block 216, "Receive Indication Of A User Level Authentication From The Device Via The Secure Communication Link", a second authentication or an indication thereof may be received from device 112 via the established secure communication link. The second authentication may be at a user level. Continuing from block 216 to block 218, "Convert The Random Pad Information From The Device Related Database To A User Related Database", device random pad 114 may be moved from device shared secrets database 116 to user shared secrets database 126 in response to the received second authentication wherein device random pad 114 is converted to user random pad 128. In general, method 200 described with respect to FIG. 2 and elsewhere herein may be implemented as a computer program product, executable on any suitable computing system, or the like. For example, a computer program product for secure access to online services may be provided. Example computer program products are described with respect to FIG. 3, below, and elsewhere herein.

Figure 3:
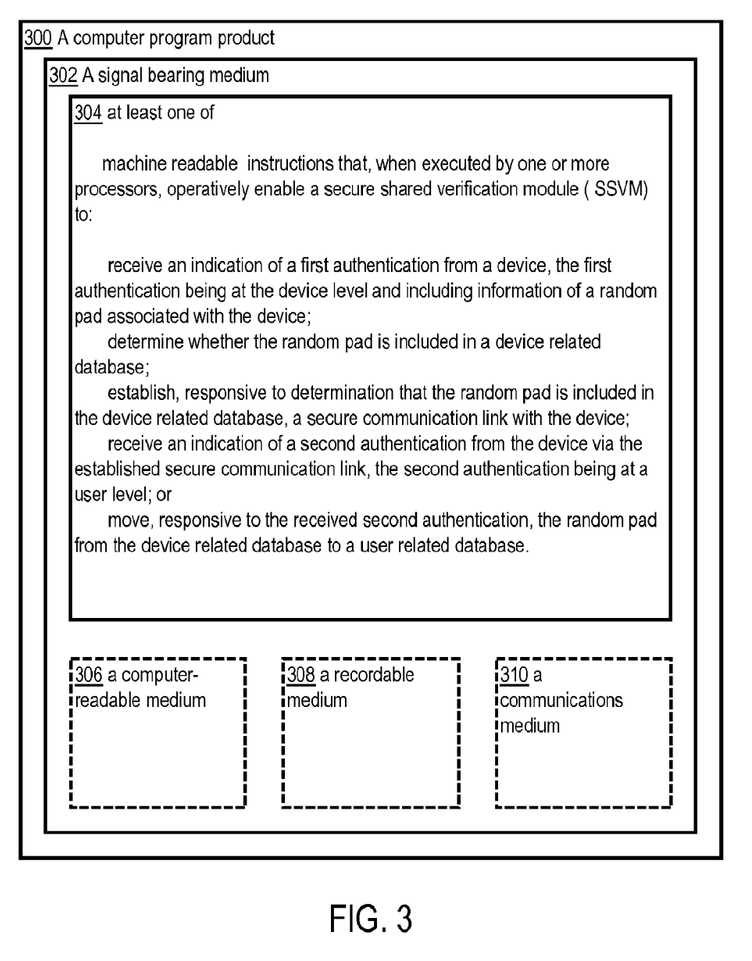
FIG. 3 illustrates an example computer program product in accordance with one or more embodiments.

FIG. 3 is a block diagram illustrating one example computer program product 300 in accordance with one or more embodiments will be discussed. Computer program product 300 may include machine-readable non-transitory medium having stored therein one or more instructions that, when executed by one or more processors, operatively enable a secure shared verification module (SSVM) according to the processes and methods discussed herein. In general, a module may refer to a component of computer program product 300 comprising one or more routines. A secure shared verification module (SSVM) may refer to a module having routines that implement authentication of device 112 using device random pad 114 as described herein. Computer program product 300 may include a signal bearing medium 302. Signal bearing medium 302 may include one or more machine-readable instructions 304, which, when executed by one or more processors, may operatively enable a computing device to provide the functionality described herein. In various examples, the devices discussed herein may use some or all of machine-readable instructions 304.

In one example, machine-readable instructions 304 may cause a processor to receive an indication of a first authentication from device 112, wherein first authentication is at the device level and includes information of device random pad 114 associated with device 112. The instructions 304 further may cause the processor to determine whether device random pad 114 is included in device shared secrets database 116, and to establish, responsive to determination that device random pad 114 is included in device shared secrets database 116, a secure communication link with device 112. The instructions 304 further may cause the processor to receive an indication of a second authentication from device 112 via the established secure communication link, the second authentication being at a user level, and to move, responsive to the received second authentication, device random pad 114 from device shared secrets database 116 to user shared secrets database 126.

In one example instructions 304 that operatively enable the SSVM to receive the indication of the first authentication from device 112 may cause the processor to operatively enable the SSVM to receive the first authentication automatically at startup of device 112. In another example, instructions 304 may cause the processor to operatively enable the SSVM to determine whether device random pad 114 was included in device 112 from device manufacturer 110. In a third example, instructions 304 may cause the processor to operatively enable the SSVM to establish the secure communication link via open standard for authorization (OAuth) server 130. In yet a further example, instructions 304 may cause the processor to operatively enable the SSVM to receive a user name and a user password. In a fifth example, instructions 304 may cause the processor to operatively enable the SSVM to move device random pad 114 in a ubiquitous computing environment. In an additional example, instructions 304 may cause the processor to operatively enable the SSVM to receive the indication from at least one of a wireless device 112 or a wired device 112.

In some implementations, signal bearing medium 302 may encompass a computer-readable medium 306, such as, but not limited to, a hard disk drive, a Compact Disc (CD), a Digital Versatile Disk (DVD), a digital tape, memory, etc. In some implementations, signal bearing medium 302 may encompass a recordable medium 308, such as, but not limited to, memory, read/write (R/W) CDs, R/W DVDs, etc. In some implementations, signal bearing medium 302 may encompass a communications medium 310, such as, but not limited to, a digital and/or an analog communication medium (e.g., a fiber optic cable, a waveguide, a wired communication link, a wireless communication link, etc.). In some examples, signal bearing medium 302 may encompass a machine readable non-transitory medium.

In general, the method described with respect to FIG. 2 and elsewhere herein and/or the computer program product described with respect to FIG. 3 and elsewhere herein may be implemented in or utilized by any suitable server and/or computing system. Example server and/or computing systems may be described with respect to FIG. 4, below, and elsewhere herein. In general, the computer system may be configured to enable secure access to online services as described herein.

Figure 4:
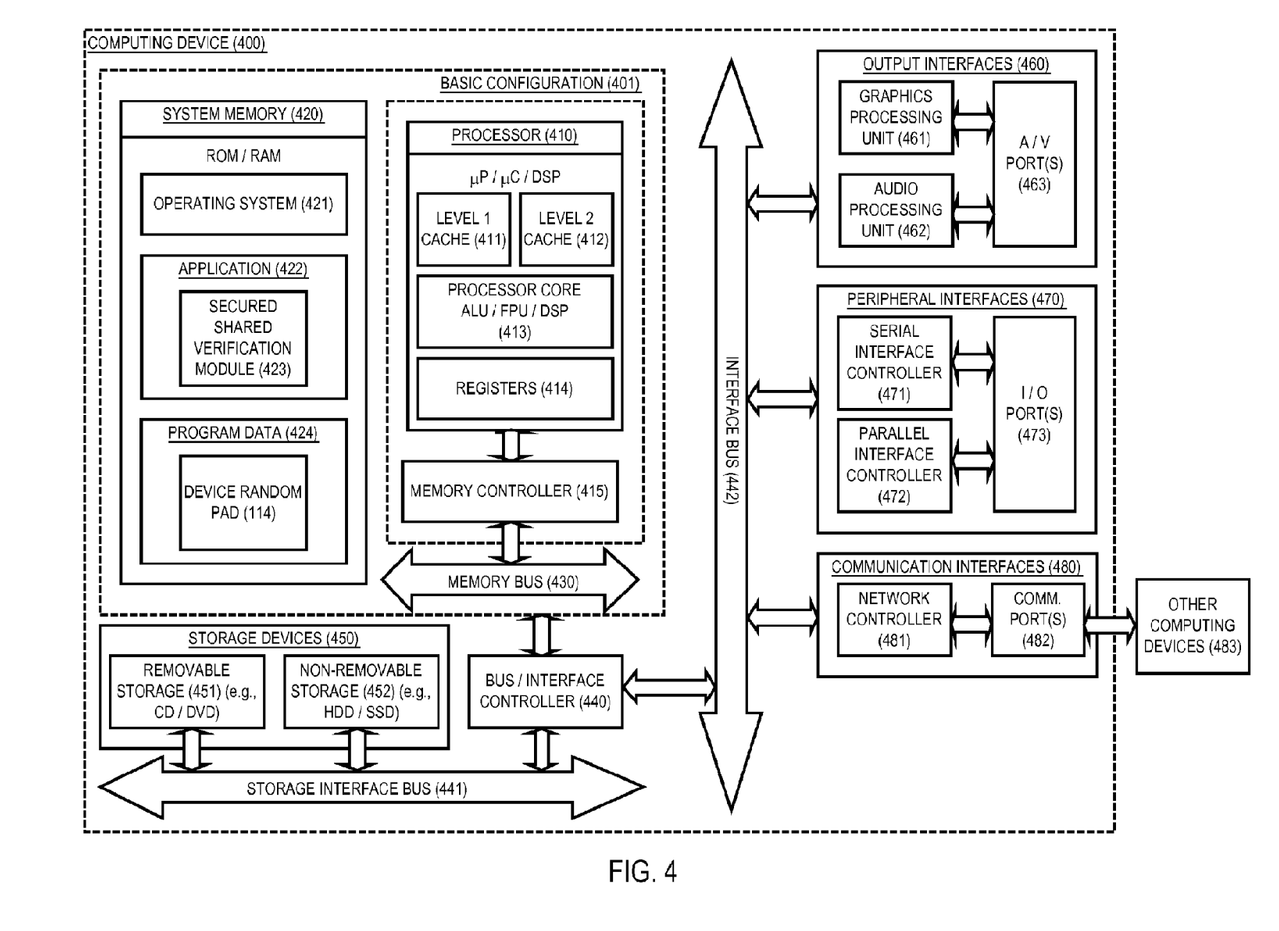
FIG. 4 illustrates a block diagram of an example computing device arranged in accordance with one or more embodiments.

FIG. 4 is a block diagram illustrating one example computing device 400 arranged in accordance with one or more embodiments will be discussed. In various examples, computing device 400 may be configured to facilitate secure access to online services as discussed herein. In one example of a basic configuration 401, computing device 400 may correspond to device 112, manufacturer 110, and/or OAuth server 130 of FIG. 1, and may include one or more processors 410 and a system memory 420. A memory bus 430 can be used for communicating between one or more of processors 410 and system memory 420.

Depending on the desired configuration, one or more of processors 410 may be of any type including but not limited to a microprocessor (µP), a microcontroller (µC), a digital signal processor (DSP), or any combination thereof. One or more of processors 410 may include one or more levels of caching, such as a level one cache 411 and a level two cache 412, a processor core 413, and registers 414. Processor core 413 can include an arithmetic logic unit (ALU), a floating point unit (FPU), a digital signal processing core (DSP Core), or any combination thereof. A memory controller 415 can also be used with one or more of processors 410, or in some implementations memory controller 415 can be an internal part of processor 410.

Depending on the desired configuration, system memory 420 may be of any type including but not limited to volatile memory (such as RAM), non-volatile memory (such as ROM, flash memory, etc.) or any combination thereof. System memory 420 may include an operating system 421, one or more applications 422, and program data 424. One or more of applications 422 may include a secure shared verification module (SSVM) application 423 that can be arranged to perform the functions, actions, and/or operations as described herein including the functional blocks, actions, and/or operations for secure access to online services as described herein. Program data 424 may include, among other data, device random pad 114 or the like for use with secure shared verification module application 423, as described herein. In some example embodiments, one or more of applications 422 may be arranged to operate with program data 424 on operating system 421. Basic configuration 401 as thus described is illustrated in FIG. 4 by those components within dashed line.

Computing device 400 may have additional features or functionality, and additional interfaces to facilitate communications between basic configuration 401 and any required devices and interfaces. For example, a bus/interface controller 440 may be used to facilitate communications between basic configuration 401 and one or more data storage devices 450 via a storage interface bus 441. One or more of data storage devices 450 may be removable storage devices 451, non-removable storage devices 452, or a combination thereof. Examples of removable storage device 451 and non-removable storage devices 452 include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 420, removable storage 451 and non-removable storage 452 are all examples of computer storage media. The computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 400. Any such computer storage media may be part of computing device 400.

Computing device 400 may also include an interface bus 442 for facilitating communication from various interface devices (e.g., output interfaces, peripheral interfaces, and communication interfaces) to basic configuration 401 via bus/interface controller 440. Example output interfaces 460 may include a graphics processing unit 461 and an audio processing unit 462, which may be configured to communicate to various external devices such as a display or speakers via one or more NV ports 463. Example peripheral interfaces 470 may include a serial interface controller 471 or a parallel interface controller 472, which may be configured to communicate with external devices such as input devices (e.g., keyboard, mouse, pen, voice input device, touch input device, etc.) or other peripheral devices (e.g., printer, scanner, etc.) via one or more I/O ports 473. An example of one or more communication interface 480 includes a network controller 481, which may be arranged to facilitate communications with one or more other computing devices 483 over a network communication via one or more communication ports 482. A communication connection is one example of a communication media. The communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared (IR) and other wireless media. The term computer readable media as used herein may include both storage media and communication media.

Computing device 400 may be implemented as a portion of a small-form factor portable (or mobile) electronic device such as a cell phone, a mobile phone, a tablet device, a laptop computer, a personal data assistant (PDA), a personal media player device, a wireless web-watch device, a personal headset device, an application specific device, or a hybrid device that includes any of the above functions. Computing device 400 may also be implemented as a personal computer including both laptop computer and non-laptop computer configurations. In addition, computing device 400 may be implemented as part of a wireless base station or other wireless system or device.

Some portions of the foregoing detailed description are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing device, that manipulates or transforms data represented as physical electronic or magnetic quantities within memories, registers, or other information storage devices, transmission devices, or display devices of the computing device.

The claimed subject matter is not limited in scope to the particular implementations described herein. For example, some implementations may be in hardware, such as employed to operate on a device or combination of devices, for example, whereas other implementations may be in software and/or firmware. Likewise, although claimed subject matter is not limited in scope in this respect, some implementations may include one or more articles, such as a signal bearing medium, a storage medium and/or storage media. This storage media, such as CD-ROMs, computer disks, flash memory, or the like, for example, may have instructions stored thereon, that, when executed by a computing device, such as a computing system, computing platform, or other system, for example, may result in execution of a processor in accordance with the claimed subject matter, such as one of the implementations previously described, for example. As one possibility, a computing device may include one or more processing units or processors, one or more input/output devices, such as a display, a keyboard and/or a mouse, and one or more memories, such as static random access memory, dynamic random access memory, flash memory, and/or a hard drive.

There is little distinction left between hardware and software implementations of aspects of systems; the use of hardware or software is generally (but not always, in that in certain contexts the choice between hardware and software can become significant) a design choice representing cost versus efficiency tradeoffs. There are various vehicles by which processes and/or systems and/or other technologies described herein can be affected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a flexible disk, a hard disk drive (HDD), a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to subject matter containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Reference in the specification to "an implementation," "one implementation," "some implementations," or "other implementations" may mean that a particular feature, structure, or characteristic described in connection with one or more implementations may be included in at least some implementations, but not necessarily in all implementations. The various appearances of "an implementation," "one implementation," or "some implementations" in the preceding description are not necessarily all referring to the same implementations.

While certain exemplary techniques have been described and shown herein using various methods and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter also may include all implementations falling within the scope of the appended claims, and equivalents thereof.

The invention claimed is:

1. A method for secure access to online services, the method comprising:
   receiving a first authentication request from a device, the first authentication request comprising a device level authentication request and a random pad associated with the device;
   determining whether the random pad is included in a device related database;
   establishing, responsive to determination that the random pad is included in the device related database, a secure communication link with the device;
   receiving a second authentication request from the device via the established secure communication link, the second authentication request comprising a user level authentication request; and
   moving, responsive to the received second authentication request, the random pad from the device related database to a user related database.

2. The method of claim 1, wherein receiving the first authentication request comprises receiving the first authentication request automatically at startup of the device.

3. The method of claim 1, wherein determining whether the random pad is include in the device related database comprises determining whether the random pad was included in the device from a device manufacturer.

4. The method of claim 1, wherein establishing the secure communication link with the device comprises establishing the secure communication link via an open standard for authorization (OAuth) based server.

5. The method of claim 1, wherein receiving the second authentication request comprises receiving a user name and a user password.

6. The method of claim 1, wherein moving the random pad from the device related database to the user related database comprises moving the random pad in a ubiquitous computing environment.

7. The method of claim 1, wherein receiving the first authentication request from the device comprises receiving the first authentication request from at least one of a wireless device or a wired device.

8. A machine readable non-transitory medium having stored therein instructions that, when executed by one or more processors, operatively enable a secure shared verification module (SSVM) to:
   receive a first authentication request from a device, the first authentication request comprising a device level authentication request and a random pad associated with the device;
   determine whether the random pad is included in a device related database;
   establish, responsive to determination that the random pad is included in the device related database, a secure communication link with the device;
   receive a second authentication request from the device via the established secure communication link, the second authentication request comprising a user level authentication request; and
   move, responsive to the received second authentication request, the random pad from the device related database to a user related database.

9. The machine readable non-transitory medium of claim 8, wherein the stored instructions that operatively enable the SSVM to receive the first authentication request from the device include instructions that, when executed by one or more processors, operatively enable the SSVM to receive the first authentication request automatically at startup of the device.

10. The machine readable non-transitory medium of claim 8, wherein the stored instructions that operatively enable the SSVM to determine whether the random pad is included in the device related database include instructions that, when executed by one or more processors, operatively enable the SSVM to determine whether the random pad was included in the device from a device manufacturer.

11. The machine readable non-transitory medium of claim 8, wherein the stored instructions that operatively enable the SSVM to establish the secure communication link with the device include instructions that, when executed by one or more processors, operatively enable the SSVM to establish the secure communication link via an open standard for authorization (OAuth) based server.

12. The machine readable non-transitory medium of claim 8, wherein the stored instructions that operatively enable the SSVM to receive the second authentication request include instructions that, when executed by one or more processors, operatively enable the SSVM to receive a user name and a user password.

13. The machine readable non-transitory medium of claim 8, wherein the stored instructions that operatively enable the SSVM to move the random pad from the device related database to the user related database include instructions that, when executed by one or more processors, operatively enable the SSVM to move the random pad in a ubiquitous computing environment.

14. The machine readable non-transitory medium of claim 8, wherein the stored instructions that operatively enable the SSVM to receive the first authentication request from the device include instructions that, when executed by one or more processors, operatively enable the SSVM to receive the authentication request from at least one of a wireless device or a wired device.

15. A system for secure access to online services comprising:
   a first database;
   a second database communicatively coupled with the first database;
   a processor communicatively coupled with the first database and the second database; and
   a secure shared verification module (SSVM) communicatively coupled to the processor, the SSVM configured to:
      receive a first authentication request from a device, the first authentication request comprising a device level authentication request and a random pad associated with the device;
      determine whether the random pad is included in the first database;
      establish, responsive to determination that the random pad is included in the first database, a secure communication link with the device;
      receive a second authentication request from the device via the established secure communication link, the second authentication request comprising a user level authentication request; and
      move, responsive to the received second authentication request, the random pad from the first database to the second database.

16. The system of claim 15, wherein to receive the second authentication request, the SSVM is configured to receive a user name and a user password.

17. The system of claim 15, wherein to move the random pad from the first database to the second database, the SSVM is configured to move the random pad in a ubiquitous computing environment.

18. The system of claim 15, wherein to receive the first authentication request from the device, the SSVM is configured to receive the first authentication request from at least one of a wireless device or a wired device.

19. The system of claim 15, wherein the first database comprises a device related database.

20. The system of claim 15, wherein the second database comprises a user related database.

* * * * *

UNITED STATES PATENT AND TRADEMARK OFFICE
CERTIFICATE OF CORRECTION

PATENT NO. : 9,288,206 B2
APPLICATION NO. : 14/358146
DATED : March 15, 2016
INVENTOR(S) : Kruglick Page 1 of 1

It is certified that error appears in the above-identified patent and that said Letters Patent is hereby corrected as shown below:

Specification

In Column 1, Line 8, delete "§371" and insert -- § 371 --, therefor.

In Column 9, Line 48, delete "NV ports 463." and insert -- A/V ports 463. --, therefor.

Signed and Sealed this
Nineteenth Day of July, 2016

Michelle K. Lee
*Director of the United States Patent and Trademark Office*